March 28, 1939. C. DE L. RICE 2,152,032
SPRING SUSPENSION
Filed Nov. 13, 1936 2 Sheets-Sheet 2
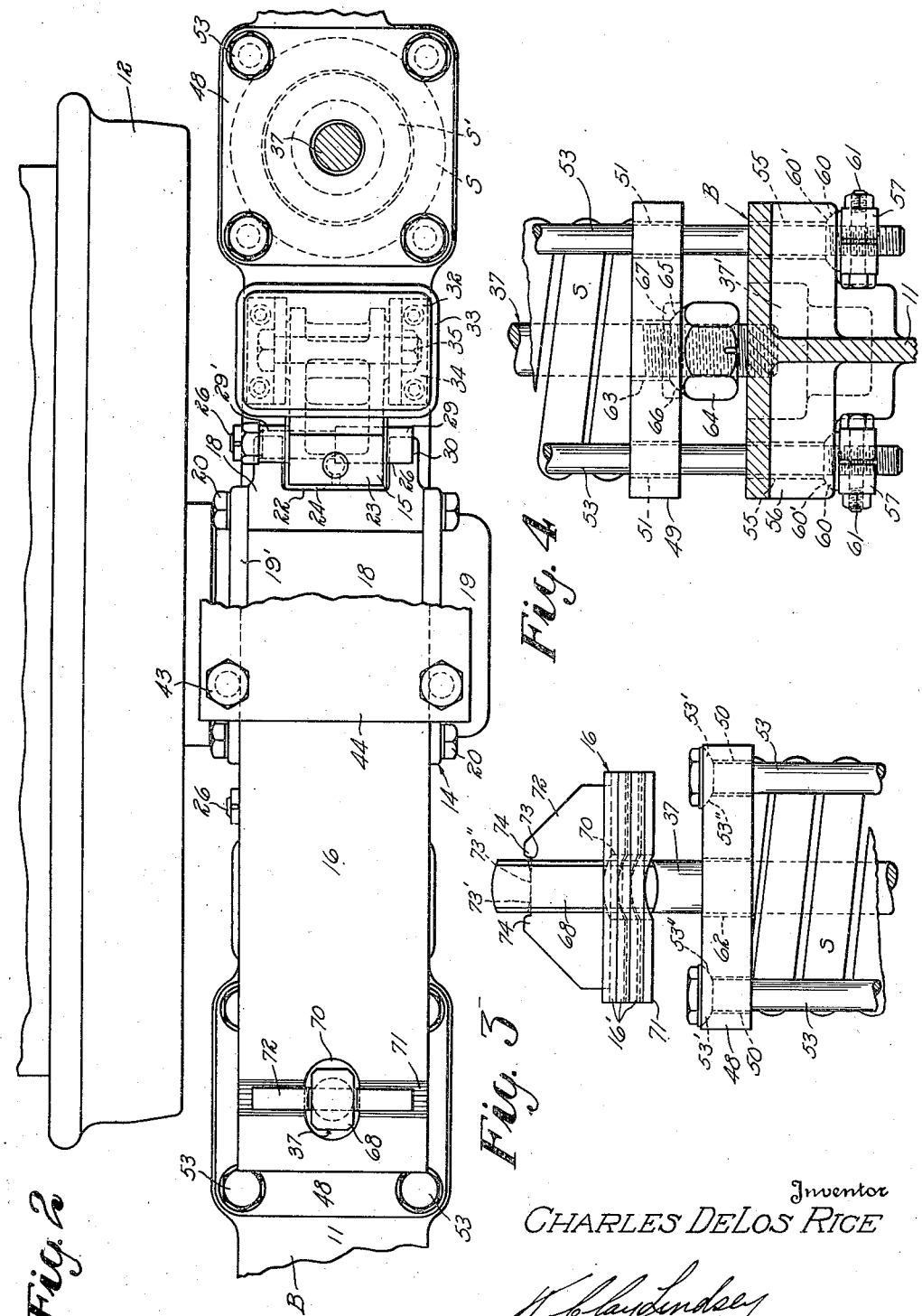
Inventor
CHARLES DeLOS RICE
By W. Clay Lindsey
Attorney Patented Mar. 28, 1939

2,152,032

UNITED STATES PATENT OFFICE 2,152,032

SPRING SUSPENSION

Charles De Los Rice, West Hartford, Conn.

Application November 13, 1936, Serial No. 110,588

3 Claims. (Cl. 105—224)

This invention relates generally to improvements in spring suspensions and, more particularly, to a railway car spring suspension arranged to cushion the relative movements between the car truck and the wheels.

An aim of my invention is to provide an improved spring suspension arranged to resiliently support the truck frame of a railway car on wheeled axles in such manner that the car movement occasioned by curved and uneven portions of track will be cushioned and the vertical and sidesway movements of the truck frame relative to the axles will be resiliently resisted.

A further object of my invention resides in the provision of a spring suspension of the type described having various novel and advantageous features particularly characterized by the compactness of parts, smoothness of operation, simplicity of structure, and economy of manufacture and assembly, as well as the ruggedness of construction.

Other objects will be apparent in view of the following detailed description of my invention.

My invention accordingly consists in the features of construction, combination of elements, and arrangement of parts which will be exemplified in the construction hereafter set forth and the scope of the application of which will be indicated in the appended claims.

In the accompanying drawings wherein is shown, for illustrative purposes, one embodiment which the present invention may take:

Fig. 2 is a plan view of my improved spring suspension with certain parts broken away to better illustrate the construction;

Fig. 3 is a fragmentary view taken along the line 3—3 of Fig. 1; and

Fig. 4 is a fragmentary view taken along the line 4—4 of Fig. 1.

Figure 1:
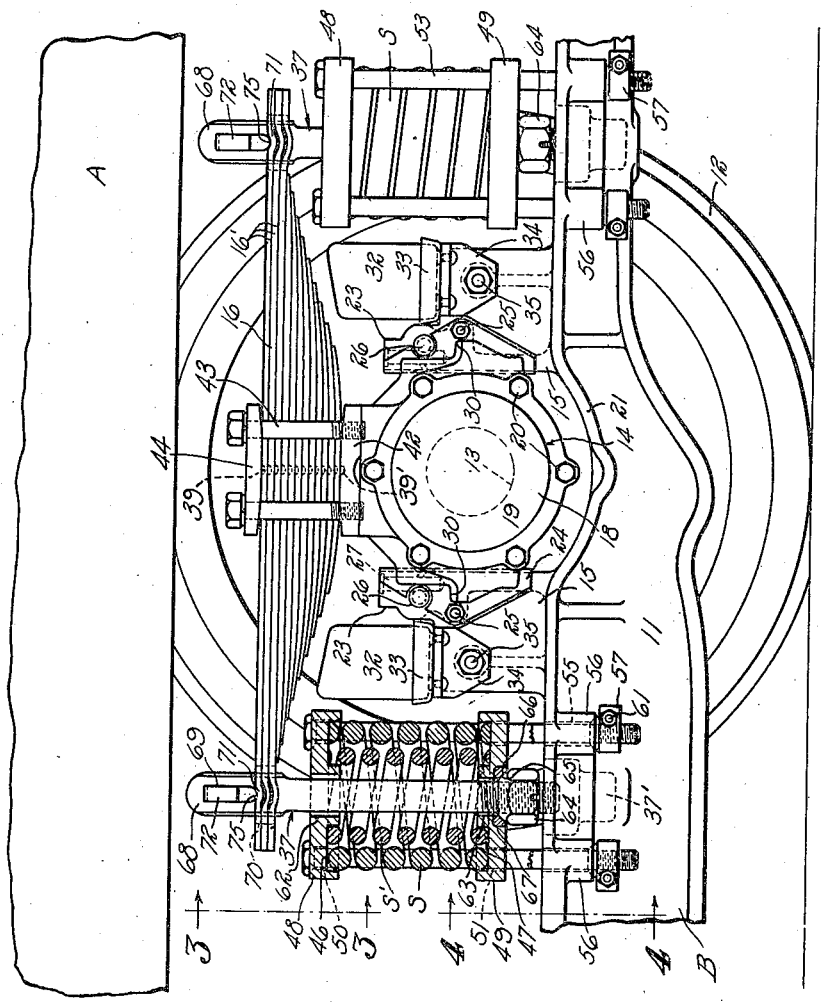
Figure 1 is a side elevation of fragmentary portions of a car body and supporting truck having my improved spring suspension applied thereto.

In accordance with my invention, one end of a railway car body A is suitably and pivotally supported on a car truck frame B having underslung H-section side frame members, one of which is shown at 11. The truck is provided with a plurality of rail wheels, one of which is designated at 12, and mounted upon a supporting axle 13 for rotation therewith. The truck may have a plurality of axles, and a pair of wheels are respectively secured on each axle near its ends. The ends of the axles which protrude beyond the wheels are received within bearings in journal boxes 14 respectively located above the side frame members. Each journal box is slidably received between upstanding reinforced guide members 15 of the frame, and a multi-leaf spring 16 centrally secured to the top of each journal box longitudinally overlies each side frame member and is resiliently secured at its opposite ends thereto by means of one or more coiled compression springs which cooperate with the leaf spring to resiliently support the car truck and car as well as to serve in the capacity of shock absorbers and absorb the recoil of spring 16, thus preventing breakage thereof.

Referring to the illustrated construction of my invention, each journal box includes a body portion 18 within which a bearing is concealed by means of a cover plate 19 closing the outer end of the journal box and an apertured cover plate 19' closing the space between the body portion 18 and the axle at the inner end of the journal box. These cover plates may be secured in position as by cap screws 20. Each side frame member 11 extending beneath each journal box has a reinforced depression 21 to provide for vertical movement of the frame and clearance between the frame and journal box.

The body portion 18 is provided, along its opposite sides and above frame portion 11, with vertically extending guideways or grooves 22 within which upwardly extending legs 23 of guide members 15 are respectively slidably received. In the present instance, guide members 15 are integral with and extend upwardly from the top of frame members 11. To reduce the wear between members 15 and guideways 22, legs 23 are of smaller dimensions than the respective guideways, and wear-resistant liners 24, somewhat U-shaped in transverse section, are secured in overlying relation with the legs by bolts 25 and arranged to slidably fit within guideways 22. These liners may be formed of any suitable material such as manganese steel and are spaced apart from one another just sufficiently to closely receive the journal box between them for free vertical movement and prevent any appreciable lengthwise movement of the truck frame B with respect to the journal box and provide only sufficient room for oil between the guides and the bottom surfaces of the guideways. A downwardly extending oil hole 27 in the top of each leg 23 contains an oil wick and communicates at its lower end with a hole passing through members 23 and 24 so that oil may be fed between the contacting faces. Guideways 22 are preferably of greater width than the portions of liners 24 received therebetween, as indicated in Fig. 2, so as to provide sufficient side clearance between the journal boxes and the liners, thus allowing for transverse movement between the truck frame and journal boxes which is resiliently resisted by the spring suspension as will be later described.

Each member 23 is further provided with a transversely extending bolt 26 projecting laterally from each side of liners 24 to act as stops, indicated at 29 and 29', which overhang extensions 30 disposed to the opposite sides of each guideway, thus preventing the truck frame from falling down onto the rails and causing disaster in the event that the spring suspension should become broken. In the present instance, stop member 29' is illustrated in the form of a sleeve slidably mounted over the bolt and secured in position by a nut. As shown in Fig. 1, the liners are preferably cut away adjacent to the projecting ends of bolts 26.

In the event that the railway car passes over a particularly rough portion of road bed, resulting in an excessive recoil of spring 16 sufficient to cause breakage thereof, I have provided a pair of snubbers adapted to engage the underside of the leaf spring and comprising rubber bumpers 32 located on each side of the journal box above frame member 11, as illustrated in Fig. 1. These bumpers may be cemented, as by shellac, within cup-shaped members 33 riveted to angle brackets 34 which, in turn, are rigidly and removably fastened to the reinforced guide members 15, as by the bolts 35.

Referring to the means for suspending the truck frame from the journal boxes, I have so constructed the same in accordance with my invention that the truck frame is provided with a resiliently restricted vertical and sidewise movement with respect to the axles so that car A will tend to ride smoothly. Each spring suspension generally consists of the multi-leaf spring 16 rigidly secured intermediate of its ends to the journal box and having depending link bolts, generally indicated at 37, respectively pivotally connected at their upper ends to depressed end portions of the leaf spring and connected at their lower ends through one or more coiled springs to a side frame member 11 on each side of the journal box, as illustrated in Fig. 1. In view of the fact that the interconnection between each end of spring 16 and the side frame member is the same, corresponding parts will be similarly indicated and only one of such constructions will be described to avoid duplication.

Spring 16 may comprise the usual well-known type of horizontally disposed multi-leaf spring having a suitable number of superimposed leaves 16' with the successive lower leaves being of shorter length and centrally located with respect to each other by somewhat cup-shaped depressed depending portions 39 which successively nest within each other. The cup-shaped depression on the bottom spring leaf seats within a locating cavity 39' in a spring supporting saddle 42 formed at the top of the journal box.

The saddle extends transversely to either side of the spring, and cap screws 43 on each side of the spring pass through a cap plate 44 overlying the top central spring portion and threadably engage within the saddle serving to tightly clamp the spring between the cap plate and saddle. These screws may have spring washers beneath their heads to prevent their loosening from position. The underside of plate 44 and the top face of the saddle are preferably longitudinally curved away from each other towards the opposite ends of the spring, as illustrated in Fig. 1, to aid in permitting flexure of the central portion of the spring. It will be appreciated that with this construction spring 16 may be assembled and secured in position with any desired number of leaves in accordance with cars of different weights.

The opposite ends of spring 16 are resiliently interconnected to the frame members 11 by interchangeable coiled springs serving in the capacity of shock absorbing devices to provide easy riding qualities for the car. One or more of these springs of suitable characteristics may be employed at each end of spring 16 in accordance with the weight of a loaded car to be supported. These coil springs are preferably so chosen that they will be only partially compressed under the weight of a loaded car and may further compress when the wheels encounter curves and rough portions of track, thus serving as shock absorbers which prevent jolts and jars from being normally transmitted to the car body as well as to absorb and smooth out the action of spring 16 and prevent spring breakage. In the illustrated construction, each connection between the frame and the end of spring 16 involves the use of a pair of coiled compression springs S and S' surrounding each link bolt 37 and received at their opposite ends within annular recesses 46 and 47 of respective upper and lower end plates 48 and 49 and coaxially located by the respective outer and inner concentric shoulders of the recesses.

In the present instance, the end plates 48 and 49 are illustrated as substantially square in contour and provided with respective holes 50 and 51 at each of their corners freely receiving bolts 53 which are of considerably smaller diameter than the holes. The underside of each bolt head terminates in a parti-spherical face 53' received within a mating curved seat 53'' at the top of each hole 50 in plate 48, as shown in Fig. 3. The bottom of the bolts pass freely through holes 55 of corresponding size to holes 50 and 51 and located in bosses 56 depending on either side of frame members 11. The bottom of the bolts threadably receive nuts 57 provided at their respective upper ends with parti-spherical portions 60 received within mating seats 60' coaxial with and at the bottom of holes 55, as shown in Fig. 4. Nuts 57 are preferably split and provided with locking bolts 61 transversely extending therethrough to clamp the nuts in pre-adjusted positions. Hence, it will be appreciated that since the bolts 53 extend freely through the holes 50, 51, and 55 and the bolt heads and nuts are arranged to rock within their respective seats, the end plates and spring assemblies are free to assume a slight swinging movement to compensate for the sidesway of the truck frame.

The link bolts 37 which extend downwardly from the ends of spring 16 freely project through the respective holes 62 and 63 centrally of end plates 48 and 49 and are each threaded on their lower ends to receive an adjustment nut 64 having a parti-spherical upper face 65 received within a mating seat 66 on the underside of plate 49 to support the spring assembly. Holes 62 and 63 are of sufficient size to permit free angular movement of link bolts 37 within plates 48 and 49 corresponding to the free angular movement of bolts 53 through the respective holes in the end plates and in bosses 56. If desired, seat 66 may be formed in a separate wear-resistant member 67 inserted within a recess in end plate 49, as illustrated. Nuts 64 are preferably of the castellated type so that a cotter pin may be inserted therethrough and through a hole in the lower end of link bolts 37 to secure the nuts in preadjusted position. The top of the frame beneath each link bolt 37 is also provided with a downwardly extending cavity 37' to assure sufficient clearance between the bottom of the link bolts, nut 64, and the truck frame during a spring movement.

The upper end of each link bolt terminates in an elongated head 68 which passes freely through overlying longitudinal slots 70 respectively extending through the top overlying spring leaves 16' near their ends, as illustrated in Figs. 1 and 3. The spring leaves containing these slots are provided with superposed transversely extending depressed curved portions 71 intercepting the slots intermediate of their ends, and each successive lower depressed portion is of successively greater curvature than that of portion 71 thereabove so that portions 71 do not closely interfit with one another and do not restrict the inter-slidable relation of the contacting spring leaves when the spring is flexed.

Each head 68 has a transversely extending slot 69 receiving a rocker member 72. The top of each rocker member has a centrally disposed depressed portion 73 provided with a substantially flat face 73' contacting with the transversely extending somewhat rounded top face 73'' of slot 69 and terminating at its ends in shoulders 74 on each side of head 68 to laterally locate the rocker member in position. The bottom of each rocker member is rounded as at 75 to a slightly lesser curvature than the top depression 71 within which it seats, thus providing a free rocking movement of member 72, as illustrated in Figs. 1 and 2.

From the foregoing description taken in connection with the accompanying drawings, it will be apparent that springs 16 and the coiled springs S and S' cooperatively serve through rocker members 72, link bolts 37, end plates 48 and 49, and bolts 53 to resiliently support the truck frame B beneath the axles in such manner that the frame may be adjustably positioned with respect to the axles and rails by means of nuts 57 and 64. This adjustment is preferably so made that each pair of snubbers 32 will normally lie out of contact with and in corresponding spaced relation beneath the bottom of a spring 16 serving only to engage the spring when there is excessive spring recoil. The slidable co-relation of liners 24 within grooves 22 prevents longitudinal truck frame movement relative to the wheeled axles and permits a free relative vertical movement and a limited relative sidewise movement between the truck frame and wheels. The bolts 53 and link bolts 37 will normally be located substantially centrally of the holes in the members through which they extend, and the rocking movement of faces 73'' on faces 73' as well as the relative rocking movement of the link bolts 37 and bolts 53 in their respective rounded seats will compensate for the sidewise truck movement.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a wheeled axle, a journal box on an end of the axle, a truck frame having a longitudinally extending member beneath the journal box and substantially at right angles to the axle, upwardly projecting guides on said member engaging the journal box in straddling relation and limiting said member and journal box to relative vertical and sidewise movements, a multi-leaf spring secured intermediate of its ends on the journal box, coiled compression springs resiliently interconnecting the ends of the multi-leaf spring with the portion of said member therebeneath, and snubber members respectively secured to said guides and located beneath the leaf spring to limit the extent of recoil thereof.

2. In combination, a wheeled axle, a journal box on an end of the axle, a truck frame beneath the box, a leaf spring mounted intermediate of its ends on the journal box, a link bolt pivotally received within and depending from the end of said spring, a nut threaded on the lower end of the link bolt and having a parti-spherical upper face, a plate having a hole therethrough freely receiving said link bolt and supported upon the parti-spherical face for free rocking movement, a coiled compression spring supported by the plate and surrounding said link bolt, an upper plate having a hole therethrough freely receiving the link bolt and supported upon said spring, and means freely passing through said plates and pivotally and adjustably supporting the frame beneath said plates whereby said parts associated with the coiled spring may move with a universal swinging movement to compensate for a sidesway of the truck relative to the journal box.

3. In combination, a wheeled axle, a journal box on one end of the axle, a truck frame beneath the journal box, a multi-leaf spring secured intermediate of its ends to the journal box, said spring having apertures therethrough adjacent its opposite ends, said apertures being intercepted by transversely extending depressed curved portions of the spring, link bolts respectively depending from said spring and through said apertures, a rocker member pivotally secured to the link bolt and pivotally received within each depressed curved portion, a plate surrounding the lower end of the link bolt and supported thereby for free relative rocking movement, a coiled compression spring surrounding the link bolt and supported by said plate, a second plate freely surrounding the link bolt and supported at its upper end on the top of said spring, and bolts interconnecting said second-mentioned plate and the frame for a universal swinging movement of said second plate relative to said frame.

CHARLES DE LOS RICE.